United States Patent [19]
Gunn

[11] 3,708,742
[45] Jan. 2, 1973

[54] HIGH DC TO LOW DC VOLTAGE CONVERTER

[75] Inventor: John B. Gunn, Mount Kisco, N.Y.

[73] Assignee: International Business Machines Corporation, Armonk, N.Y.

[22] Filed: June 30, 1971

[21] Appl. No.: 158,173

[52] U.S. Cl....................................321/15, 307/150
[51] Int. Cl..............................................H02m 7/00
[58] Field of Search...............321/2, 15, 18; 307/150

[56] References Cited

UNITED STATES PATENTS

| | | | |
|---|---|---|---|
| 3,564,387 | 2/1971 | Adler | 321/18 X |
| 3,478,258 | 11/1969 | Nagai | 307/110 X |
| 3,505,586 | 4/1970 | Dulin | 321/15 |
| 3,553,479 | 1/1971 | Nelson | 307/110 |

OTHER PUBLICATIONS

Instrumentation Technology "Transformerless Power Supply", IBM, Vol. 17, No. 5, May 1970, p. 66,
Electronics, "D-C Converter Circuit Uses Capacitors", p. 97, Mar. 21, 1966

Primary Examiner—William M. Shoop, Jr.
Attorney—John A. Jordan et al.

[57] ABSTRACT

Transformerless high DC to low DC voltage conversion is achieved by alternately charging a plurality of capacitors in series from the input voltage source, and discharging them in parallel into the load. The charging and discharging are effected by transistor switches, which are in turn controlled by the voltage across one of the plurality of capacitors. Charging stops, and discharging begins, when this voltage rises above a first predetermined value; discharging stops, and charging begins, when this voltage falls below a second, lower, predetermined value. During charging, voltage across the load is maintained by a permanently connected reservoir capacitor. The difference between the predetermined voltage values, and hence the ripple on the output voltage, is preselected by certain circuit constants, whereas the mean of the two values is controlled by comparing the DC component of the output voltage with a reference value, so as to maintain the DC load voltage constant despite variations in load current.

21 Claims, 1 Drawing Figure

PATENTED JAN 2 1973
3,708,742
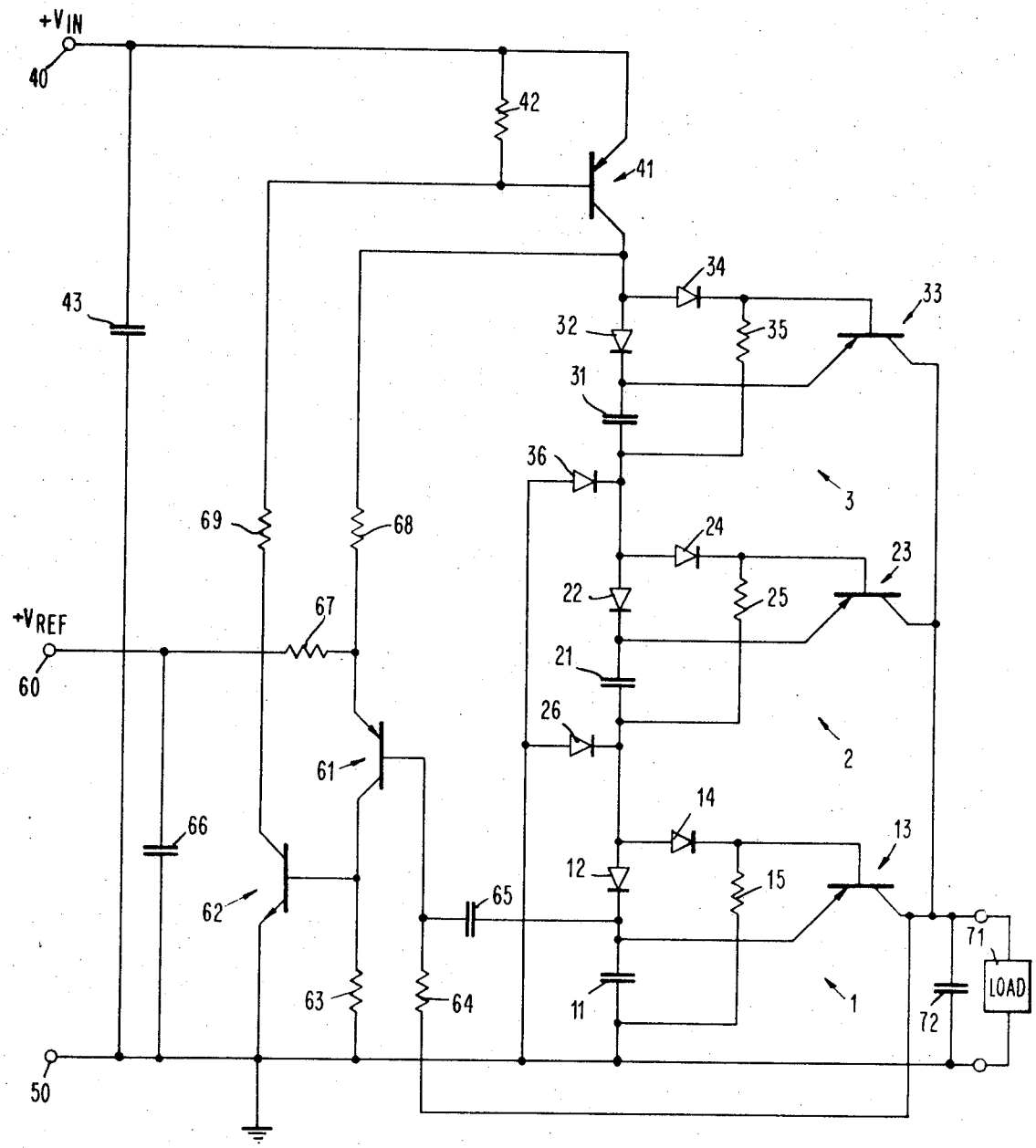
INVENTOR
JOHN B. GUNN
BY John A. Jordan
ATTORNEY

HIGH DC TO LOW DC VOLTAGE CONVERTER

BACKGROUND OF THE INVENTION

The present invention relates to conversion circuits for converting high voltage DC to low voltage DC and, more particularly, to transformerless circuits for converting high voltage DC to low voltage DC which low voltage DC is regulated against variations in load current.

Typical of the most commonly used apparatus for converting one magnitude and/or plurality of DC to another are those employing switching arrangements for first chopping the DC input voltage so that the voltage is in a form whereby it may be transformed from one voltage level to another by transformer means, or the like. After the chopped voltage has been transformed from one voltage level to another, a rectifier arrangement is employed to provide the new level DC output. There are many disadvantages to using transformer arrangements in DC converters. For example, transformers are necessarily bulky and involve a considerable amount of weight. In addition, transformers are expensive and are known to involve a certain degree of inefficiency. Not only are the transformer-type converter arrangements inefficient but, in addition, typically the converted output voltage therefrom is unregulated and, accordingly, many applications necessitate the use of an additional stage for purposes of regulation.

Some transformerless-type voltage converters are known in the prior art. However, as in the case with the transformer-type voltage converter, the usual prior art transformerless-type voltage converter produces an output voltage which is not effectively regulated against variations in load current. Typical of the prior art transformerless-type voltage converters are those described in U.S. Pat. No. 3,470,443, issued Sept. 30, 1969 to Berry et al. and U.S. Pat. No. 3,470,446, also issued Sept. 30, 1969 to Berry et al. Likewise, U.S. Pat. No. 3,513,376, issued May 19, 1970 to Hajeck and U.S. Pat. No. 3,497,792, issued Feb. 24, 1970 to Mlynar, each describe transformerless converter apparatus for converting high voltage DC to low voltage DC. Likewise, U.S. Pat. No. 3,477,011, issued Nov. 4, 1969, to Westwood, describes a transformerless apparatus which may be used to convert DC to DC.

However, as hereinabove indicated, in all of the commonly employed prior art transformerless-type DC to DC conversion apparatus, as typified by the above-cited patents, the resultant converted DC output voltage is not adequately regulated against variations in load current. One reason for this is that the typical prior art DC to DC conversion apparatus, whether of the transformer-type or the transformerless-type, normally employs a separate, unvarying source of control voltage for controlling the switch employed for chopping the DC input. With such an arrangement, the voltage delivered to the load is a function of the load current and the input voltage level.

Accordingly, it can be seen that the use of a separate source of control voltage for chopping the DC input is ineffective for regulation and is known to result in a certain degree of inefficiency. Not only are existing techniques for controlling the chopper operation for chopping the DC input ineffective for regulation and inefficient but, in addition, in the recent transformerless-type used for high voltage DC to low voltage DC conversion, the common configurations used for the charging-discharging circuitry are, likewise, complex and inefficient. In this latter regard, the charging-discharging circuitry employed in the present invention is similar to that employed in applicants' copending application Ser. No. 866,929, filed Oct. 16, 1969, and assigned to the assignee of the present invention.

SUMMARY OF THE INVENTION

In accordance with the principles of the present invention, there is provided a transformerless conversion circuit for converting a high voltage DC input to a low voltage DC output, with the conversion arrangement such that the output voltage is regulated against both variations in load current and variations in the high voltage DC input. To achieve this end, the high voltage DC input is alternately connected and disconnected to a voltage transformation circuit which circuit includes a plurality of capacitors. During the time intervals when the DC input voltage is connected to the voltage transformation circuit, the plurality of capacitors are charged in series. During the alternate time intervals when the DC input voltage is disconnected from the voltage transformation circuit, the plurality of capacitors are discharged in parallel through the load circuit. The connecting and disconnecting of the DC input voltage to the voltage transformation circuit is controlled in response to changes in the voltage level on one of the capacitors of the voltage transformation circuit. In accordance with such an arrangement, the frequency with which the DC input signal is connected to the voltage transformation circuit varies in accordance with load current, since load current determines the rate at which the capacitor voltage, used for controlling the switching, discharges. Accurate regulation of the output voltage, particularly as pertains to regulation against variations in load current, is achieved by taking only the AC component of the voltage used for controlling the charging and discharging from the capacitor in the voltage transformation circuit and taking the DC component from a reservoir capacitor in the output circuit.

It is therefore an object of the present invention to provide an improved DC converter circuit for converting high voltage DC to low voltage DC.

It is a further object of the present invention to provide an improved transformerless high voltage DC to low voltage DC converter.

It is yet a further object of the present invention to provide a transformerless conversion and regulation apparatus for converting a high voltage DC to a low voltage regulated DC.

It is still a further object of the present invention to provide a high voltage DC to low voltage DC conversion circuit whereby the high voltage DC input is alternately connected to charge a plurality of capacitors in series and disconnected to discharge the charged plurality of capacitors in parallel, and where the voltage across one of the plurality of capacitors is employed to control the times at which the high voltage DC input is connected to charge said plurality of capacitors.

The foregoing and other objects, features and advantages of the invention will be apparent from the following more particular description of a preferred embodiment of the invention, as illustrated in the accompanying drawings.

BRIEF DESCRIPTION OF THE DRAWINGS

The FIGURE shows a schematic of the DC conversion circuit, in accordance with the principles of the present invention.

DETAILED DESCRIPTION OF THE DRAWINGS

The circuit diagram shown in the FIGURE represents one particular embodiment of the transformerless high DC to low DC conversion and regulation circuit, in accordance with the present invention. It should be recognized that although the embodiment shows a conversion apparatus for converting positive DC, as applied to terminals 40 and 50, apparatus may readily be implemented for converting negative DC. It should also be reconegized that although three charging-discharging stages are shown, which stages are generally designated by reference characters 1, 2, and 3, in general, a greater number or fewer stages may readily be employed.

In accordance with the arrangement shown in the FIGURE, the high voltage DC input applied to terminal 40 is alternately connected and disconnected to the plurality of respective storage capacitors 11, 21 and 31, by way of switching transistor 41. During the time intervals when the high voltage input is connected to the plurality of storage capacitors, they are connected effectively in series by diodes 12, 22 and 32. Conversely, during the time intervals when the high voltage input is disconnected from the plurality of storage capacitors, they are connected effectively in parallel to the load 71, by transistor switches 13, 23 and 33, and diodes 26 and 36.

The control voltage applied to the base of transistor 41, for effecting control of the connecting and disconnecting of the high voltage DC input to the plurality of charging capacitors, is obtained from a differential amplifier arrangement comprising transistors 61 and 62. One input to the differential amplifier is connected to a positive reference voltage at 60 and the other input is connected to both capacitor 11 of the charging capacitors, via capacitor 65 and to capacitor 72 in the output circuit via resistor 64. The particular purpose for, and the manner of operation of, the capacitor connections to the differential amplifier will become more apparent, hereinafter.

For purposes of describing the operation of the circuit of the FIGURE neglect the voltage across capacitor 65 and assume initially that the three capacitors 11, 21 and 31 are charged. Assume further that the voltage $V_{11}$ on capacitor 11 is sufficiently high, compared with the voltage $V_{REF}$ on terminal 60, to maintain transistor 61, and hence transistors 62 and 41, cut off. The respective currents through resistors 15, 25 and 35 will be applied to the bases of corresponding transistors 13, 23 and 33, turning them on. This action tends to make the lower sides of capacitors 21 and 31 go negative with respect to ground, turning on diodes 26 and 36.

Thus, at this time, capacitors 11, 21 and 31 are each connected to load 71, discharging therethrough effectively in parallel. Eventually, as a result of this discharge the voltage $V_{B61}$ at the base of transistor 61 (which for the moment is assumed equal to $V_{11}$) falls far enough below the voltage $V_{E61}$ at the emitter of transistor 61, for transistor 61 to begin to conduct. Consequently, transistors 62 and 41 also begin to conduct. The resulting rise in the voltage $V_{C41}$ at the collector of transistor 41 is transmitted by way of the voltage divider, comprising resistors 68 and 67, to the emitter of transistor 61. This causes all three transistors to conduct more strongly, and a regenerative action is set up which results in transistor 41 being turned hard on by a base current approximately equal to $V_{IN}/R_{69}$, where $R_{69}$ is the resistance of resistor 69.

With transistor 41 now fully conducting, the consequent large collector current therethrough starts to rapidly charge capacitors 11, 21 and 31 in series through diodes 12, 22 and 32. The forward bias voltage developed across these diodes causes the (approximately constant) current flowing through resistors 15, 25 and 35 to be diverted into respective diodes 14, 24 and 34, and away from the bases of transistors 13, 23 and 33. Transistors 13, 23 and 33 are, thus, cut off, and since diodes 26 and 36 become reverse biased by the rise in voltage at the lower sides of capacitors 21 and 31, capacitors 11, 21 and 31 are now isolated from load 71. Current is still delivered to the load, however, from charge stored in reservoir capacitor 72.

Charging continues until $V_{11}$ and $V_{B61}$ rise sufficiently (with respect to $V_{E61}$) to reduce conduction through transistors 61, 62 and 41. When that point is reached, $V_{C41}$ begins to drop, and this change, again transmitted through voltage divider 67 and 68, sets up another regenerative action which results in transistors 61, 62 and 41 being cut off. As a result of the absence of charging current, transistors 13, 23 and 33 and diodes 26 and 36 turn on again, and the cycle repeats.

It can be seen that the effect of the circuit is to cycle $V_{11}$ between upper and lower limits $V_1$ and $V_2$, respectively. The ripple $V_1-V_2$ is mainly determined by the ratio of the voltage divider comprising resistors 67 and 68, while the mean value $(V_1 + V_2)/2$ is mainly determined by $V_{REF}$ and the value of $V_{E61} - V_{B61}$ needed to turn on transistor 61. Although it is the voltage $V_{11}$ which is actually controlled, the voltages across capacitors 21 and 31 are constrained to closely follow $V_{11}$, since all three capacitors 11, 21 and 31 are effectively in parallel during the discharge phase of the cycle, and all receive the same charge during the charging phase.

It should be noted that the effect of variations in load current is to change the discharge time, without affecting either the charging time, or $V_1$ and $V_2$. Similarly, changes in $V_{IN}$ have no effect on the output voltage as long as $V_{IN}$ remains sufficiently above the sum of the voltages across series capacitors 11, 21 and 31 and series diodes 12, 22 and 32 to prevent transistor 41 from saturating. Thus, the circuit has inherent regulation of capacitor voltage against changes of input and output conditions.

By suitable choice of circuit parameters, the charging phase of the conversion circuit, in accordance with the principles of the present invention, may be made of sufficiently short duration, such that the voltage across capacitor 72 does not change appreciably during the charging phase. Likewise, $V_1-V_2$ can be made sufficiently small, such that variations across capacitor 72 during the discharge phase are also small.

However, under the operation, thus far explained, it is clear that the output voltage is not regulated against changes in load current, because of the finite resistance of transistors 13, 23 and 33, even in their "on" state. This difficulty is overcome by deriving the DC component (that is, the mean value) of $V_{B61}$, the voltage on the base transistor 61, from the output itself, while continuing to derive the AC component (the ripple) from capacitor 11 so as to retain control over the charging process. The latter form of control is accomplished by use of the network comprising capacitor 65 and resistor 64, as shown in the FIGURE. In accordance with such an arrangement, regulation against changes in load are effectively obtained.

Thus, in accordance with the present invention, the frequency with which the charging capacitors are charged through transistor 41 increases with increases in load current demand and a fixed ripple is maintained, equal to $V_1-V_2$, and a fixed output voltage, independent of load current and input voltage, is assured thereby. In regard to the input voltage $V_{IN}$, it should be recognized that any changes therein are taken up across the collector-base junction of transistor 41 as long as $V_{IN}$ remains somewhat greater than $NV_{11}$, where N is the number of charging stages, which is three in the embodiment shown. Thus, transistor 41 serves somewhat as a series regulator. In this regard, it is clear that transient variations in $V_{IN}$ are taken up by capacitor 43. Likewise, capacitor 66 takes up transient variations in $V_{REF}$, at terminal 60.

The following table gives s a of typical parameter values that may be employed for the various elements of the preferred embodiment shown in the FIGURE.

TABLE

| ELEMENT | VALUE |
| --- | --- |
| C11 | 1 μf |
| C21 | 1 μf |
| C31 | 1 μf |
| C43 | 1 μf |
| C65 | 0.22 μf |
| C66 | 0.03 μf |
| C72 | 1 μf |
| R15 | 2.2 K Ohms |
| R25 | 2.2 K Ohms |
| R35 | 2.2 K Ohms |
| R42 | 100 Ohms |
| R63 | 100 Ohms |
| R64 | 2.2 K Ohms |
| R67 | 10 Ohms |
| R68 | 2.2 K Ohms |
| R69 | 220 Ohms |

While the invention has been particularly shown and described with reference to a preferred embodiment thereof, it will be understood by those skilled in the art that various changes in form and details may be made therein without departing from the spirit and scope of the invention.

What is claimed is:

1. A power conversion circuit for converting DC power at an input voltage level to DC power at a lower controlled output voltage level, comprising:
   input terminals adapted to receive DC power from a source and output terminals adapted to deliver DC power to a load;
   storage means including at least one stage of charge storage means,
   input switching means of controllable conductance for controllably coupling said at least one stage of charge storage means in series with said input terminals;
   output switching means of controllable conductance for controllably coupling said at least one stage of charge storage means in parallel with said output terminals;
   first control means for rendering said output switching means non-conductive when said input switching means is conductive and for rendering said output switching means conductive when said input switching means is non-conductive;
   second control means for rendering said input switching means conductive when the voltage across said charge storage means falls below one voltage level and for rendering said input switching means non-conductive when the voltage across said charge storage means rises above another voltage level; and
   means for establishing said one and another voltage levels.

2. The conversion circuit as set forth in claim 1 further including charge storage means coupled between said output terminals.

3. The conversion circuit set forth in claim 1 wherein said means for establishing said one and another voltage levels is responsive to changes in voltage across said output terminals, whereby said output voltage level is maintained at a predetermined value.

4. A voltage conversion circuit for converting the DC voltage level of a DC input voltage, comprising:
   controllable conductance means having a first terminal coupled to said DC input voltage, a second terminal and control means for controlling the conductance of said controllable conductance means;
   storage means having a plurality of stages each including charge storing means with each of said charge storing means arranged to be coupled in series to said second terminal for the charging thereof when said controllable conductance means is in a high conduction condition and coupled in parallel for the discharging thereof when said controllable conductance means is in a low conduction condition; and
   means coupling said storage means to the said control means of said controllable conductance means for causing said controllable conductance means to go into a high conduction condition when the voltage level of said storage means falls below a predetermined level.

5. The conversion circuit as set forth in claim 4 wherein said storage means includes further charge storing means coupled to each of said plurality of stages so as to be in the parallel discharge path of each of the said charge storing means thereof.

6. The conversion circuit as set forth in claim 5 wherein said means coupling said storage means includes AC coupling means coupled to one of said charge storing means and DC coupling means coupled to said further charge storing means.

7. The conversion circuit as set forth in claim 5 wherein said means coupling said storage means includes detection means and further includes AC coupling means coupling the AC component from one of said charge storing means to said detection means and DC coupling means for coupling the DC component from said further charge storage means to said detection means.

8. The conversion circuit as set forth in claim 7 wherein said plurality of stages each include diode means which are forwardly biased to connect each of the said charge storing means in series to the said second terminal of said controllable conductance means for the charging thereof when said controllable conductance means is in a high conduction condition and which are reversedly biased to disconnect each of the charge storing means to thereby allow the discharge thereof when said controllable conductance means is in a low conduction condition.

9. The conversion circuit as set forth in claim 8 wherein said plurality of stages each include transistor means coupled between the said charge storing means for each of said stages and said further charge storage means, so that each of said transistor means become forwardly biased when said diode means become reversedly biased to thereby provide respective parallel discharge paths to said further charge storage means for each of said charge storing means.

10. A voltage conversion circuit for converting high voltage DC to low voltage DC, comprising:
switching means having a first terminal coupled to said high voltage DC, a second terminal and a control means for controlling said switching means;
a plurality of storage stages each including storage means all of which are arranged to be coupled in series to said second terminal for the charging thereof when said switching means is turned on and coupled in parallel for the discharging thereof when said switching means is turned off; and
means coupling one of said storage means to said control means to turn said switching means on when the level of stored charge falls below a predetermined level and to turn said switching means off when the level of stored charge rises above a second predetermined level.

11. A voltage conversion circuit for converting a high voltage DC input to a low voltage DC output, comprising:
switching means having a first terminal coupled to said high voltage DC input, a second terminal and a control terminal;
storage means including a plurality of capacitance storage means each coupled to another in series to said second terminal by first means and connected to one another in parallel by second means, said first means being operative to connect said capacitance storage means in series when said switching means is conductive and said second means being operative to connect said capacitance storage means in parallel when said switching means is non-conductive; and
means coupling the potential on one of said capacitance storage means to the said control terminal of said switching means to cause said switching means to become conductive when the voltage on said one capacitance storage means discharges to a predetermined voltage level.

12. The voltage conversion circuit as set forth in claim 11 wherein said means coupling include amplitude detection means and AC coupling means for coupling the AC component of the said potential on said one capacitance storage means to said amplitude detection means so that said switching means become conductive when the voltage on said one capacitance storage means discharges to a first predetermined voltage level and become nonconductive when the voltage on said one capacitance storage means charges to a second predetermined voltage level.

13. The voltage conversion circuit as set forth in claim 12 wherein said means coupling include DC coupling means for coupling the DC component of said low voltage DC output to said amplitude detection means whereby regulation of the output voltage is obtained with varying load currents.

14. The voltage conversion circuit as set forth in claim 13 wherein output voltage storage means are coupled to the said second means to connect said capacitance storage means in parallel and to said DC coupling means so as to thereby couple the DC voltage across said output voltage storage means to said amplitude detection means.

15. The voltage conversion circuit as set forth in claim 12 wherein said storage means includes output voltage capacitance storage means coupled to each of said plurality of capacitance storage means through said second means to connect said capacitance storage means in parallel whereby each of said plurality of capacitance storage means discharge in parallel to said output voltage capacitance storage means.

16. The voltage conversion circuit as set forth in claim 15 wherein said coupling means include DC coupling means coupling the voltage across said output voltage capacitance storage means to said amplitude detection means.

17. The voltage conversion circuit as set forth in claim 16 wherein said amplitude detection means includes differential amplifier means for comparing the composite of said AC voltage from said one capacitance storage means and the DC voltage from said output voltage capacitance storage means with a reference voltage so that when said composite is sufficiently different in value from said reference voltage said differential amplifier means acts to cause said switching means to become conductive.

18. The voltage conversion circuit as set forth in claim 17 including feedback means coupling the said second terminal of said switching means to said differential amplifier means.

19. The voltage conversion circuit as set forth in claim 18 wherein said first means are diode means and said second means are transistor means.

20. A voltage conversion circuit for converting a high voltage DC input to a low voltage regulated DC output, comprising:
switching means having a first terminal coupled to said high voltage DC input, a second terminal and control means;
voltage storage means including a plurality of capacitance storage means;
output voltage storage means;
coupling means coupling said plurality of capacitance storage means in series to the said second terminal of said switching means for the charging thereof when said switching means is in a high conduction condition and in parallel to said output voltage storage means for the discharging thereof when said switching means is in a low conduction condition;

compare circuit means coupled to one of said plurality of capacitance storage means and to reference voltage means for comparing the voltage on said one capacitance storage means with the voltage of said reference voltage means; and means coupling said compare circuit means to the said control means of said switching means for causing said switching means to enter into said high conduction condition when the voltage on said one capacitance storage means discharges to a first predetermined voltage level with respect to the voltage level of said reference voltage and into a low conduction condition when the voltage on said one capacitance storage means charges to a second predetermined voltage level with respect to the voltage level of said reference voltage.

21. The voltage conversion circuit as set forth in claim 20 wherein said compare circuit means are AC coupled to said one capacitance storage means and DC coupled said output voltage storage means so as to thereby provide voltage regulation at the output against varying load conditions.

* * * * *